UNITED STATES PATENT OFFICE.

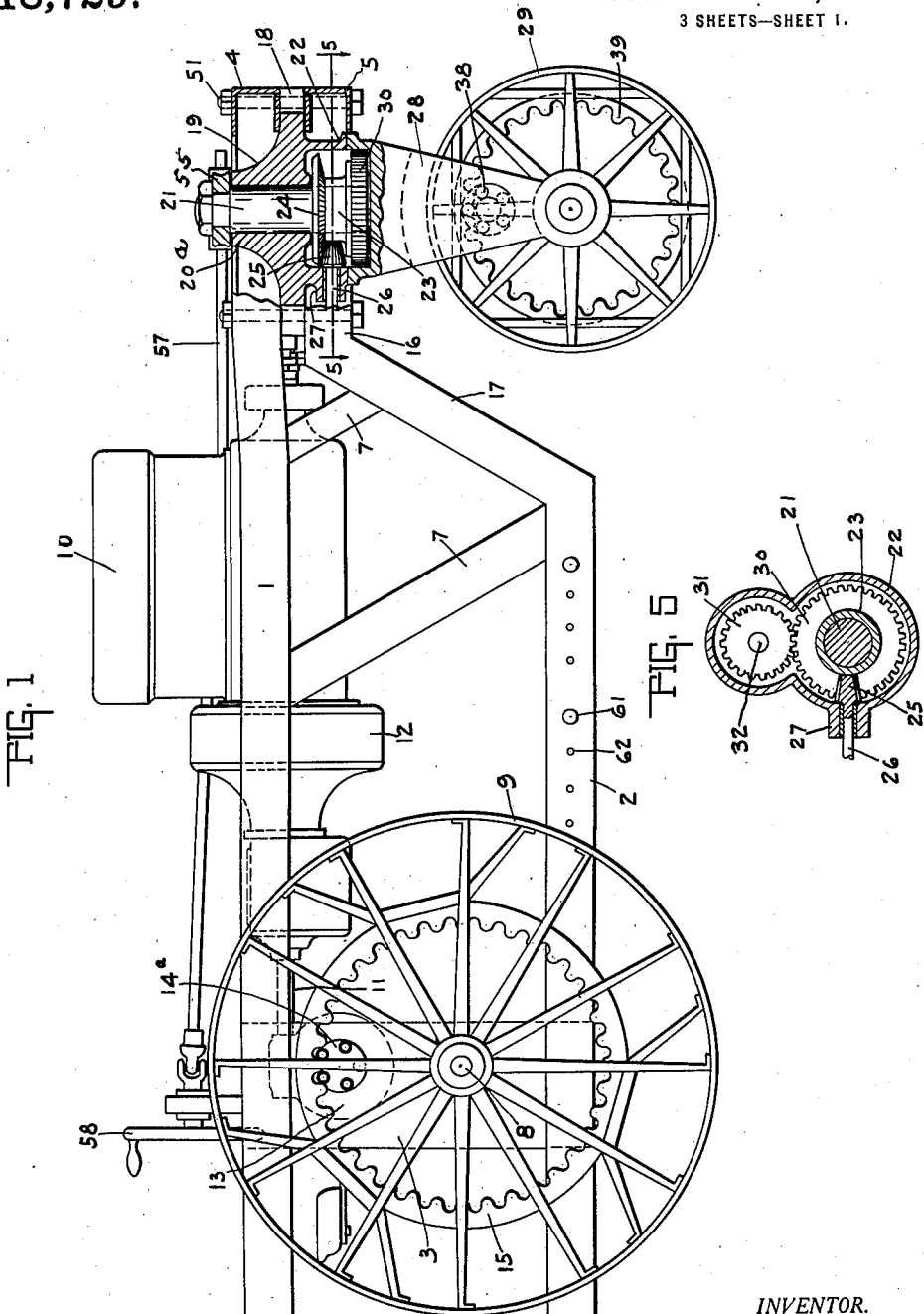

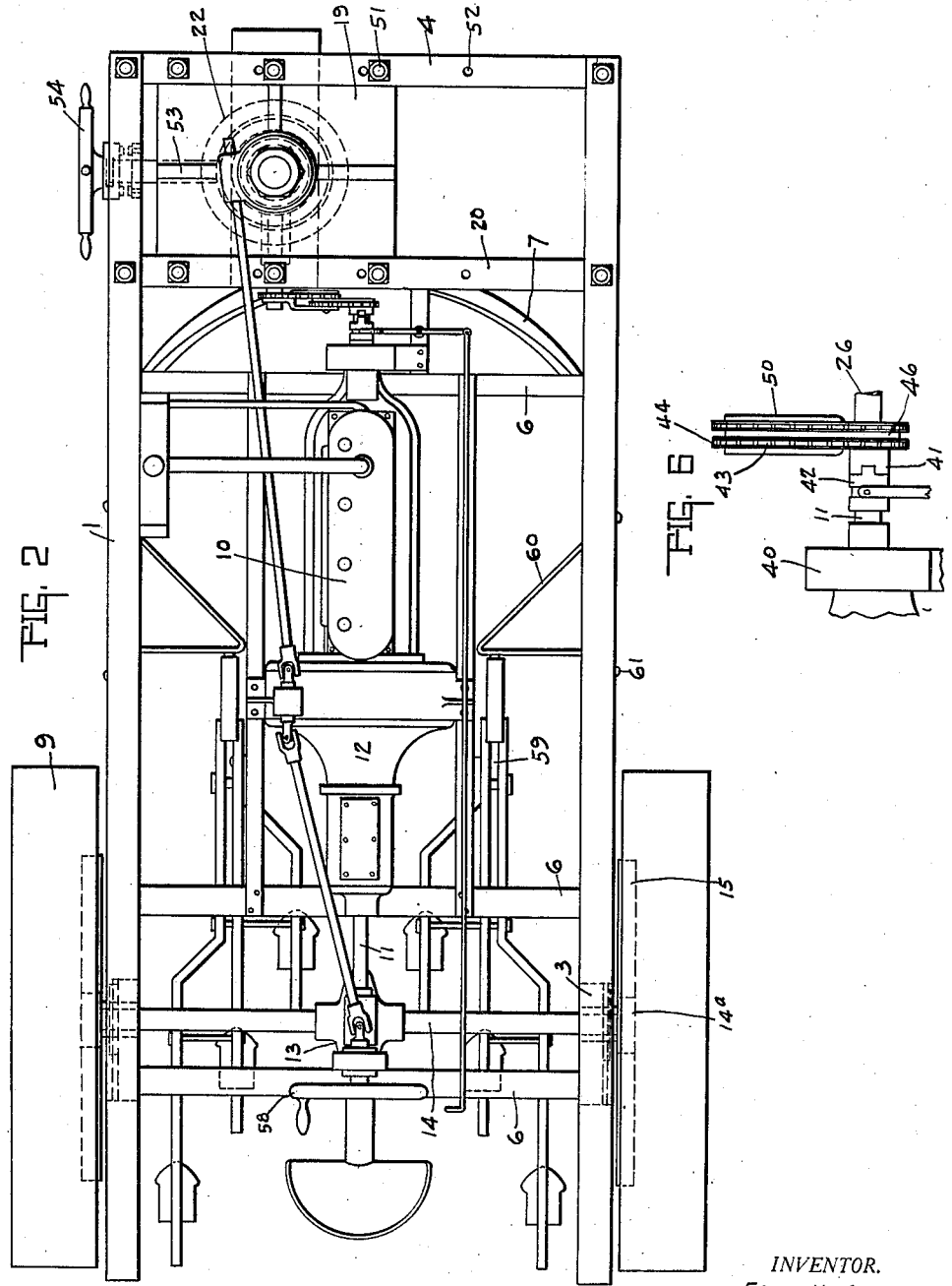

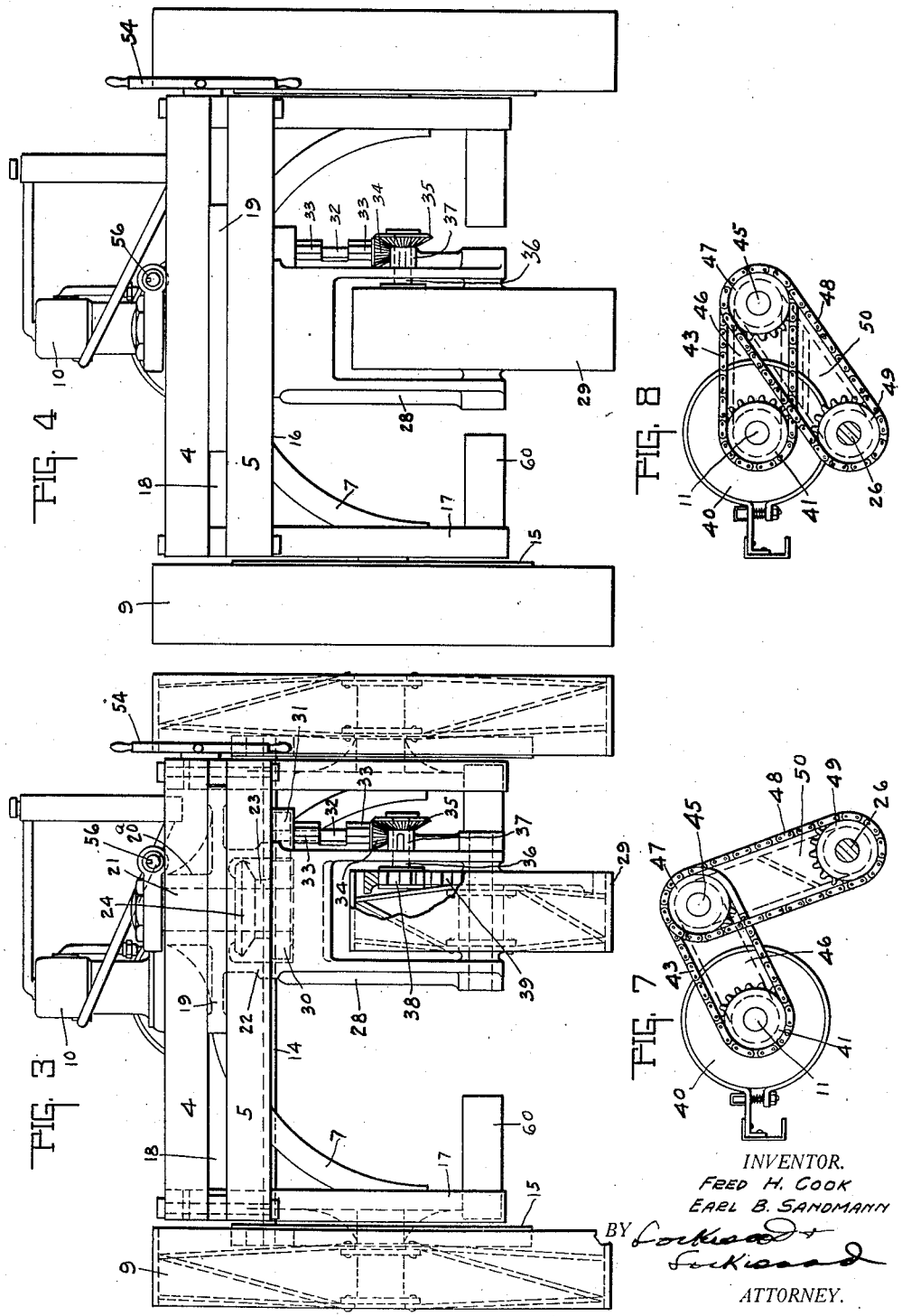

FRED H. COOK AND EARL B. SANDMANN, OF INDIANAPOLIS, INDIANA.

TRACTOR.

1,318,729.      Specification of Letters Patent.      Patented Oct. 14, 1919.

Application filed August 26, 1918. Serial No. 251,551.

*To all whom it may concern:*

Be it known that we, FRED H. COOK and EARL B. SANDMANN, citizens of the United States, and residents of Indianapolis, county of Marion, and State of Indiana, have invented a certain new and useful Tractor; and we do hereby declare that the following is a full, clear, and exact description thereof, reference being had to the accompanying drawings, in which like numerals refer to like parts.

This invention relates to tractors and the prime feature of the invention is the production of a tractor for universal use.

A further feature of the invention is the provision of a front steering or guiding wheel, which is adjustably attached to the frame of the tractor, whereby it may be positioned at the longitudinal axial center of the frame, or adjacent to one side of the frame, as the occasion may require.

A further feature of the invention is the provision of means for applying power from the motor, employed for propelling the traction, for driving the guiding wheel.

A further feature of the invention is in so constructing the driving mechanism for the guide wheel that driving power will be applied to the driving wheel, regardless of the position of the guiding wheel, or the angle to which the same may be turned, to guide the tractor.

A further feature of the invention is in so arranging the frame of the tractor that the tractor may be used for cultivating corn, or the like, after it has reached a considerable height.

A further feature of the invention is the provision of means for controlling the direction of travel of the guide wheel, and likewise the provision of means for shifting the parts carrying said drive wheel, laterally.

A further feature of the invention is the provision of means for attaching parts of farm machinery to the frame of the tractor, whereby such machinery will always be in position to be readily controlled by the attendant on the tractor and under direct observation of the attendant.

Other objects and advantages will be hereinafter more fully set forth and pointed out in the accompanying specification.

In the accompanying drawings, which are made a part of this application, Figure 1 is a side elevation of the tractor with parts thereof in section. Fig. 2 is a top plan view of the tractor, showing the guide wheel at one side of the longitudinal center of the tractor. Fig. 3 is a front elevation thereof. Fig. 4 is a front elevation of the tractor, showing the guide wheel positioned at the longitudinal center of the tractor. Fig. 5 is a detail sectional view of the driving mechanism for the guide wheel as seen on line 5—5 of Fig. 1. Fig. 6 is a detail top plan view of the means for applying power from the engine shaft to the shaft operating the guide wheel. Fig. 7 is an enlarged elevation of the means for applying power from the engine to the driving mechanism of the guide wheel, as when the guide wheel is at one side of the longitudinal center of the tractor. Fig. 8 is a similar view, showing the position of the parts when the guide wheel is at the longitudinal center of the tractor.

Referring to the drawings in which similar reference numerals designate corresponding parts throughout the several views, 1 and 2 indicate upper and lower bars respectively of the tractor frame, said bars being preferably channel shape in cross section and attached to uprights, 3, adjacent their rear ends, while the forward ends of the bars are connected together by cross bars 4 and 5 respectively.

The upper bars, 1, are further reinforced by intermediate cross bars, 6, and the forward portion of the bars, 2, are suitably braced by means of arched bars 7, which extend from the lower side bars, 2, upward and into engagement with intermediate bars, 6, the forward ends of the side bars, 2, being extended upwardly, adjacent their forward ends and then forwardly, so that the extreme forward horizontal portions of the bars, 2, will extend parallel with the bars 1 and spaced a short distance therefrom.

Rotatably mounted upon axles, 8, carried by the uprights 3, are driving or bull wheels, 9, said wheels being driven from any suitable form of engine, 10, mounted between the bars, 1, of the frame.

The shaft, 11, of the engine extends rearwardly through the usual or any preferred form of transmission, 12, and into engagement at its rear end with the usual or any preferred form of differential gears, 13, said differential gears being in turn connected with a driving axle, 14. The ends of the driving axle project through the uprights, 3, and has at its ends roller gears, 14^A, which mesh with gear teeth 15, on the bull wheels, 9, and by means of which said wheels are driven.

The forward ends, 16, of the bars, 2, or that portion of the bars beyond the upwardly extending portions, 17, extend parallel with the bars, 1, and are spaced therefrom to form a slot, 18, and in said slot is positioned a bed plate 19, which snugly fits between the cross bars 4 and 5, and a pair of auxiliary cross bars, 20, in the rear of the cross bars 4 and 5.

The central portion of the bed plate 19, is provided with a hub, 20^a, through which extends a shaft, 21, the lower end of the shaft entering a housing, 20, depending from the bed plate. Mounted upon that portion of the shaft, 21, entering the housing, 22, is a sleeve, 23, the upper end of which is provided with a bevel gear, 24, with which meshes a bevel pinion, 25, carried by a driving shaft, 26, which extends laterally from the shaft, 21, and through a bearing, 27, in the wall of the housing, 22.

Fixed to the lower end of shaft, 21, is a yoke, 28, which carries a guide wheel, 29, and said guide wheel is positively driven by attaching a gear, 30, to the lower end of the sleeve, 23, with which meshes a pinion, 31, carried by a vertically extending shaft, 32, which is rotatably mounted in bearings, 33, on one face of the yoke 28. Attached to the lower end of the shaft, 32, is a bevel pinion, 34, which meshes with a bevel gear, 35, attached to one end of a stub shaft, 36, extending through a bearing, 37, on the yoke, 28, and at right angles to a shaft, 32. Attached to the inner end of the stub shaft, 36, is a roller gear, 38, which meshes with gear teeth, 39, on the guide wheel, 29, so that when rotating power is applied to driving shaft, 26, the guide wheel, 29, will be positively driven.

Power is applied to the driving shaft, 26, from the forward end of the engine shaft, 11, which extends through any suitable form of transmission mechanism, 40, the extreme outer end of shaft, 11, having a sprocket, 41, thereon which is rotatably mounted on the shaft, 11, and is caused to rotate with the shaft, by means of a clutch mechanism, 42. coöperating with the sprocket, 41, is a sprocket chain, 43, which extends around said sprocket, 41, and around a similar sprocket, 44, which latter sprocket is fixed to a bearing pin, 45, rotatably mounted in one end of a link, 46, the opposite end of the link being pivoted on the extreme end of shaft, 11. On the opposite side of link, 46, from the sprocket 44, is a similar sprocket, 47, which is likewise fixed with the bearing pin, 45, and around the sprocket, 47, extends a sprocket chain, 48, which in turn passes around the sprocket, 49, on the inner end of the driving shaft, 26. Pivoted on the inner end of driving shaft, 26, is a link, 50, the opposite end of which is bifurcated, said bifurcated ends passing to the outside of the two sprockets, 44 and 47, so as to hold said sprockets in proper alinement. The object in providing this form of drive between the engine shaft and the driving shaft, 26, is that when corn, or other similar farm products, which are planted in rows, is being cultivated, the guide wheel, 29, and parts carrying the same, are to be shifted to one side of the longitudinal center of the tractor as shown in Figs. 2 and 3 of the drawings, the parts of the driving mechanism between the said two shafts assuming the position shown in Fig. 7, while they will assume the position shown in Fig. 8 when the guide wheel is at the center of the tractor frame, as shown in Fig. 4 of the drawings, the sprocket, 49, traveling laterally in a straight line, while the sprocket wheels, 44 and 47, travel in the arc of a circle around the engine shaft, 11.

The bed plate, 19, to which the guide wheel, 29, is attached is held in its adjusted position by means of bolts 51, which pass through one set of openings in the cross bars, 4, 5 and 20, and through the interposed portion of the bed plate, 19, when the bed plate is positioned as shown in Fig. 2, and through an additional set of openings, 52, in the parts, 4, 5, and 20, when the bed plate is in the position shown in Fig. 4 of the drawings.

To facilitate the lateral adjustment of the bed plate, 19, a shaft, 53, is threaded into engagement with the bed plate, 19, in any suitable manner, the outer end of the shaft, 53, having a hand wheel, 54, for rotating the shaft to adjust the bed plate.

Attached to the upper end of the shaft, 21, is a worm gear, 55, with which coöperates a worm, 56, said worm being splined to a tumbler rod, 57, which extends from the worm to the rear end of the tractor, or to a point adjacent the seat for the driver, said end having a steering wheel, 58, thereon, whereby the tumbler rod may be readily manipulated to change the direction of travel of the guide wheel, 29, thereby controlling the travel of the tractor.

As shown in Fig. 2 of the drawings, cultivators, 59, such as used in cultivating corn and the like, are shown in use on the tractor, although it will be understood that other forms of cultivators, breaking plows, planters and the like may be substituted therefor. In order to position the cultivators so that they will be under convenient observation of the driver, the forward end of the beams of the cultivators are attached to the brackets, 60, which are adjustably attached to the side bars, 2, of the frame through the medium of bolts, 61, which pass through the openings, 62, in the side bars, 2. The brackets, 60, are preferably positioned forwardly of the wheels, 9, so that a downward pull, caused by the drag of the cultivators, will be directed against the forward portion of the frame of the tractor.

In operating the device, power is applied to the driving axle, 14, from the engine, 10, in the usual manner and the wheel, 29, is controlled through the medium of the tumbler rod, 57, to guide the tractor as it moves forwardly or rearwardly. When it is desired to turn the tractor, as when the end of the field is reached, and to accomplish this result using a minimum amount of space, the yoke, 28, is rotated until the guide wheel, 29, extends substantially at right angles to the trend of the tractor frame, when by operating the clutch, 42, to engage the hub of the steering wheel, 41, to cause said sprocket to rotate with the forward end of the shaft, 11, power will be applied to the drive wheel, 29, thereby enabling the tractor to turn in a very limited space. As soon as the tractor is turned to the proper position to make its return trip, the clutch, 42, may, if desired, be disconnected from the sprocket, 41, so that the guide wheel will run idle until the opposite end of the field is reached.

Owing to the construction of the frame of the tractor and providing the arched bars, the cultivation of corn can be continued until the corn has reached the same or a greater height as when using an ordinary horse drawn cultivator. Furthermore, by employing the means herein shown for attaching the various farm implements to the tractor, any make of farm implement may be operated with the tractor, as said tractor does not require any special form of implement, in order to adapt the same for use therewith, and furthermore, the tractor can be used for drawing breaking plows, harrows, planters and cultivators, and in fact can be universally used for all cultivating purposes.

The invention claimed is:—

1. A universal tractor including a frame structure, a guide wheel at one end of said frame, means for moving said guide wheel laterally of the frame for positioning the same at the center of said frame or at one side of the center thereof, and means for locking said wheel in its adjusted positions.

2. A universal tractor comprising a frame structure consisting of upper and lower bars, cross bars connecting the upper set of bars, arch bars connecting the lower bars with the upper bars, driving wheels connecting with the frame structure, an engine for driving said wheels, a guide wheel at one end of the frame, manually operated means for moving said wheel laterally on the frame, and means for locking said wheel in its adjusted position, means for guiding said wheel and means for positively driving the guide wheel from the engine.

3. A universal tractor including a frame structure, driving wheels mounted on the frame structure, an engine for applying power to said driving wheels, a guiding wheel for said tractor, manually operated means for moving the guiding wheel on the frame, means for positively driving the guide wheel from said engine, and means to direct the course of travel of said guide wheel.

4. A universal tractor including a frame structure, a guide wheel, means to adjustably attach the guide wheel to the frame structure, means for moving said guide wheel laterally on the frame to which it is attached an engine on the frame structure, gears for positively driving said guide wheel, a driving shaft connecting with said gears, an engine shaft, shiftable driving means between the engine shaft and driving shaft, and transmission mechanism for regulating the speed of the driving mechanism.

5. A universal tractor comprising a frame, a bed plate carried by the frame, and laterally adjustable thereon, means to move said bed plate to the longitudinal center of the frame, or to one side thereof, a guide wheel carried by said bed plate and adjustable therewith, means for positively driving said guide wheel when desired, and means to control the direction of travel of said guide wheel.

6. A universal tractor including a frame, a bed plate transversely adjustable between parts of the frame, means to hold the bed plate in its adjusted position, a shaft pivotally mounted through said bed plate, a yoke fixed to said shaft, a guide wheel carried by the yoke, gears rotatable on said shaft, intermeshing gears between the gears of the shaft and the guide wheel for positively driving the guide wheel, a driving shaft, a pinion on the driving shaft coöperating with one of the gears on the first mentioned shaft, an engine carried by the frame, an engine shaft, and combined sprocket and chain driving means between the engine shaft and the driving shaft.

7. In a universal tractor, the combination with an engine having a shaft, a guide wheel and driving gears for the guide wheel, of a sprocket on the engine shaft, a similar sprocket connected with the driving gears for the guide wheel, a link pivoted on the engine shaft, a bearing pin carried by the link, a sprocket on each end of the bearing pin and on opposite sides of the link, a bifurcated link extending from said bearing to parts of the driving mechanism for the guide wheel, a sprocket chain connecting the sprocket on the engine shaft with one of the sprockets on the bearing pin, and a similar sprocket chain connecting the sprocket on the guide wheel driving mechanism with the other sprocket on the bearing pin.

In witness whereof, we have hereunto affixed our signatures.

FRED H. COOK,
EARL B. SANDMANN.